United States Patent
Wang et al.

(10) Patent No.: US 7,873,632 B2
(45) Date of Patent: Jan. 18, 2011

(54) SYSTEMS AND METHODS FOR ASSOCIATING A KEYWORD WITH A USER INTERFACE AREA

(75) Inventors: Niniane Wang, Santa Clara, CA (US); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 388 days.

(21) Appl. No.: 11/834,497

(22) Filed: Aug. 6, 2007

(65) Prior Publication Data

US 2007/0271262 A1 Nov. 22, 2007

Related U.S. Application Data

(63) Continuation of application No. 10/814,053, filed on Mar. 31, 2004, now Pat. No. 7,272,601.

(51) Int. Cl.
*G06F 7/00* (2006.01)
*G06F 17/30* (2006.01)

(52) U.S. Cl. ...................................... 707/725
(58) Field of Classification Search ............... 707/3, 707/4, 5
See application file for complete search history.

(56) References Cited

U.S. PATENT DOCUMENTS

| | | |
|---|---|---|
| 5,418,948 A | 5/1995 | Turtle |
| 5,678,038 A | 10/1997 | Dockter et al. |
| 5,696,962 A | 12/1997 | Kupiec |
| 5,701,469 A | 12/1997 | Brandli et al. |
| 5,717,913 A | 2/1998 | Driscoll |
| 5,754,938 A | 5/1998 | Herz et al. |
| 5,796,393 A | 8/1998 | MacNaughton et al. |
| 5,826,261 A | 10/1998 | Spencer |
| 5,890,152 A | 3/1999 | Rapaport et al. |
| 5,911,139 A | 6/1999 | Jain et al. |
| 5,933,827 A | 8/1999 | Cole et al. |
| 5,940,821 A | 8/1999 | Wical |
| 5,964,839 A | 10/1999 | Johnson et al. |
| 5,987,446 A | 11/1999 | Corey et al. |
| 6,012,067 A | 1/2000 | Sarkar |
| 6,014,665 A | 1/2000 | Culliss |
| 6,070,158 A | 5/2000 | Kirsch et al. |
| RE36,727 E | 6/2000 | Kageneck et al. |
| 6,112,203 A | 8/2000 | Bharat et al. |

(Continued)

OTHER PUBLICATIONS

Czerwinski et al., "Visualizing Implicit Queries For Information Management and Retrieval", CHI '99, May 15-20, 1999, ACM, pp. 560-567.*

(Continued)

*Primary Examiner*—Michael J Hicks
*Assistant Examiner*—Neveen Abel-Jalil
(74) *Attorney, Agent, or Firm*—Fenwick & West LLP (57) ABSTRACT

Systems and methods for associating a keyword with a window are described. In one described system, a computer program, such as an indexer, captures processor, or query system, associates a keyword with a first user interface area. The query system or other computer program receives a signal that the first user interface is inactive and that a second user interface area is active and, in response, generates an implicit search query that includes the keyword associated with the first user interface area.

19 Claims, 4 Drawing Sheets

U.S. PATENT DOCUMENTS

| | | | |
|---|---|---|---|
| 6,122,647 | A | 9/2000 | Horowitz et al. |
| 6,167,434 | A | 12/2000 | Pand |
| 6,199,059 | B1 | 3/2001 | Dahan et al. |
| 6,272,507 | B1 | 8/2001 | Pirolli et al. |
| 6,295,529 | B1 | 9/2001 | Corston-Oliver et al. |
| 6,321,228 | B1 | 11/2001 | Crandall et al. |
| 6,397,221 | B1 | 5/2002 | Greef et al. |
| 6,421,675 | B1 | 7/2002 | Ryan et al. |
| 6,460,036 | B1 | 10/2002 | Herz |
| 6,473,752 | B1 | 10/2002 | Fleming |
| 6,484,164 | B1 | 11/2002 | Nikolovska et al. |
| 6,490,575 | B1 | 12/2002 | Berstis |
| 6,505,191 | B1 | 1/2003 | Baclawski |
| 6,546,388 | B1 | 4/2003 | Edlund et al. |
| 6,571,234 | B1 | 5/2003 | Knight et al. |
| 6,583,798 | B1 | 6/2003 | Hoek et al. |
| 6,587,856 | B1 | 7/2003 | Srinivasan et al. |
| 6,602,300 | B2 | 8/2003 | Ushioda et al. |
| 6,633,868 | B1 | 10/2003 | Min et al. |
| 6,665,666 | B1 | 12/2003 | Brown et al. |
| 6,687,704 | B1 | 2/2004 | Russell |
| 6,697,799 | B1 | 2/2004 | Neal et al. |
| 6,697,840 | B1 | 2/2004 | Godefroid et al. |
| 6,745,178 | B1 | 6/2004 | Emens et al. |
| 6,766,320 | B1 | 7/2004 | Wang et al. |
| 6,772,188 | B1 | 8/2004 | Cloutier |
| 6,778,951 | B1 | 8/2004 | Contractor |
| 6,785,671 | B1 | 8/2004 | Bailey et al. |
| 6,795,825 | B2 | 9/2004 | Rishe |
| 6,801,906 | B1 | 10/2004 | Bates |
| 6,803,906 | B1 | 10/2004 | Morrison et al. |
| 6,820,093 | B2 | 11/2004 | de la Huerga |
| 6,820,237 | B1 | 11/2004 | Abu-Hakima et al. |
| 6,834,287 | B1 | 12/2004 | Folk-Williams et al. |
| 6,850,934 | B2 | 2/2005 | Bates et al. |
| 6,853,998 | B2 | 2/2005 | Biebesheimer et al. |
| 6,874,126 | B1 | 3/2005 | Lapidous |
| 6,925,456 | B2 | 8/2005 | Nakano et al. |
| 6,948,134 | B2 | 9/2005 | Gauthier et al. |
| 6,950,791 | B1 | 9/2005 | Bray et al. |
| 6,961,910 | B2 | 11/2005 | Lee et al. |
| 6,961,954 | B1 | 11/2005 | Maybury et al. |
| 6,963,830 | B1 | 11/2005 | Nakao |
| 6,976,053 | B1 | 12/2005 | Tripp et al. |
| 6,976,090 | B2 | 12/2005 | Ben-Shaul et al. |
| 7,007,085 | B1 | 2/2006 | Malik |
| 7,022,905 | B1 | 4/2006 | Hinman et al. |
| 7,027,975 | B1 | 4/2006 | Pazandak et al. |
| 7,031,961 | B2 | 4/2006 | Pitkow et al. |
| 7,032,174 | B2 | 4/2006 | Montero et al. |
| 7,039,650 | B2 | 5/2006 | Adams et al. |
| 7,043,492 | B1 | 5/2006 | Neal et al. |
| 7,047,502 | B2 | 5/2006 | Petropoulos et al. |
| 7,054,860 | B2 | 5/2006 | Inaba et al. |
| 7,054,870 | B2 | 5/2006 | Holbrook |
| 7,062,442 | B2 | 6/2006 | Berg et al. |
| 7,082,428 | B1 | 7/2006 | Denny et al. |
| 7,099,860 | B1 | 8/2006 | Liu et al. |
| 7,146,399 | B2 | 12/2006 | Fox et al. |
| 7,162,473 | B2 | 1/2007 | Dumais |
| 7,171,352 | B2 | 1/2007 | Chang et al. |
| 7,181,459 | B2 | 2/2007 | Grant et al. |
| 7,194,455 | B2 | 3/2007 | Zhou et al. |
| 7,194,485 | B2 | 3/2007 | Kaipa et al. |
| 7,231,395 | B2 | 6/2007 | Fain et al. |
| 7,293,014 | B2 | 11/2007 | Subramaniam et al. |
| 7,293,015 | B2 | 11/2007 | Zhou |
| 7,305,129 | B2 | 12/2007 | Chellapilla et al. |
| 7,318,049 | B2 | 1/2008 | Iannacci |
| 7,412,708 | B1 | 8/2008 | Khan et al. |
| 7,421,645 | B2 | 9/2008 | Reynar |
| 7,437,353 | B2 | 10/2008 | Marmaros et al. |
| 7,451,136 | B2 | 11/2008 | Chua et al. |
| 7,478,089 | B2 | 1/2009 | Henkin et al. |
| 2001/0037328 | A1 | 11/2001 | Pustejovsky et al. |
| 2001/0037377 | A1 | 11/2001 | Nakano et al. |
| 2002/0016786 | A1 | 2/2002 | Pitkow et al. |
| 2002/0019763 | A1 | 2/2002 | Linden et al. |
| 2002/0040311 | A1 | 4/2002 | Douglass et al. |
| 2002/0059272 | A1 | 5/2002 | Porter |
| 2002/0065800 | A1 | 5/2002 | Morlitz |
| 2002/0069194 | A1 | 6/2002 | Robbins |
| 2002/0095427 | A1 | 7/2002 | Kaplan |
| 2002/0099700 | A1 | 7/2002 | Li |
| 2002/0103698 | A1 | 8/2002 | Cantrell |
| 2002/0103737 | A1 | 8/2002 | Briere |
| 2002/0103806 | A1 | 8/2002 | Yamanoue |
| 2002/0116291 | A1 | 8/2002 | Grasso et al. |
| 2002/0129059 | A1 | 9/2002 | Eck |
| 2002/0174101 | A1 | 11/2002 | Fernley et al. |
| 2003/0014398 | A1 | 1/2003 | Ohta |
| 2003/0020749 | A1 | 1/2003 | Abu-Hakima et al. |
| 2003/0033296 | A1 | 2/2003 | Rothmuller et al. |
| 2003/0046311 | A1 | 3/2003 | Baidya et al. |
| 2003/0055831 | A1 | 3/2003 | Ryan et al. |
| 2003/0069877 | A1 | 4/2003 | Grefenstette et al. |
| 2003/0079185 | A1 | 4/2003 | Katariya et al. |
| 2003/0093276 | A1 | 5/2003 | Miller et al. |
| 2003/0093790 | A1 | 5/2003 | Logan et al. |
| 2003/0115552 | A1 | 6/2003 | Jahnke et al. |
| 2003/0123443 | A1 | 7/2003 | Anwar |
| 2003/0130982 | A1 | 7/2003 | Kasriel et al. |
| 2003/0135490 | A1 | 7/2003 | Barrett et al. |
| 2003/0135499 | A1 | 7/2003 | Schirmer et al. |
| 2003/0154071 | A1 | 8/2003 | Shreve |
| 2003/0158855 | A1 | 8/2003 | Farnham et al. |
| 2003/0208493 | A1 | 11/2003 | Hall et al. |
| 2003/0220913 | A1 | 11/2003 | Doganata et al. |
| 2004/0001104 | A1 | 1/2004 | Sommerer et al. |
| 2004/0003097 | A1 | 1/2004 | Willis et al. |
| 2004/0030741 | A1 | 2/2004 | Wolton et al. |
| 2004/0036716 | A1 | 2/2004 | Jordahl |
| 2004/0059564 | A1 | 3/2004 | Zhou |
| 2004/0059730 | A1 | 3/2004 | Zhou |
| 2004/0064447 | A1 | 4/2004 | Simske et al. |
| 2004/0068486 | A1 | 4/2004 | Chilovskii |
| 2004/0073534 | A1 | 4/2004 | Robson |
| 2004/0122656 | A1 | 6/2004 | Abir |
| 2004/0133560 | A1 | 7/2004 | Simske |
| 2004/0139106 | A1 | 7/2004 | Bachman et al. |
| 2004/0143569 | A1 | 7/2004 | Gross et al. |
| 2004/0215607 | A1 | 10/2004 | Travis |
| 2004/0225667 | A1 | 11/2004 | Hu et al. |
| 2004/0267700 | A1 | 12/2004 | Dumais et al. |
| 2004/0267730 | A1 | 12/2004 | Dumais et al. |
| 2004/0267813 | A1 | 12/2004 | Rivers-Moore et al. |
| 2005/0065909 | A1 | 3/2005 | Musgrove et al. |
| 2005/0114306 | A1 | 5/2005 | Shu et al. |
| 2005/0125382 | A1 | 6/2005 | Karnawat et al. |
| 2005/0125390 | A1 | 6/2005 | Hurst-Hiller et al. |
| 2005/0187920 | A1 | 8/2005 | Tenembaum et al. |
| 2005/0198026 | A1 | 9/2005 | Dehlinger et al. |
| 2005/0222987 | A1 | 10/2005 | Vadon |
| 2005/0262073 | A1 | 11/2005 | Reed |
| 2006/0010150 | A1 | 1/2006 | Shaath et al. |
| 2006/0136405 | A1 | 6/2006 | Ducatel et al. |

OTHER PUBLICATIONS

Lieberman, "Letizia: An Agent That Assists Web Browsers", AAAI Technical Report FS-95-03, pp. 97-102, 1995, AAAI.*
Czerwinski, M., et al., "Visualizing Implicit Queries for Information Management and Retrieval," CHI 99, May 15-20, 1999, ACM, pp. 560-567.

Garofalakis, M., et al., "XTRACT: A System for Extracting Document Type Descriptors from XML Documents," SIGMOD, ACM, Jun. 2000, p. 165-176, vol. 29, No. 2.

Horvitz, E., et al., "The Lumiere project: Bayesian user modeling for inferring the goals and needs of software users", Proceedings of the Fourteenth Conference on Uncertainty, 1998, pp. 256-265, Morgan Kaufmann: San Francisco.

Joho, H., et al., "A Study of User Interaction with a Concept-Based Interactive Query Expansion Support Tool," Advances in Information Retrieval, A Study of User Interaction, Lecture Notes in Computer Science, Mar. 2, 2004, pp. 42-56, vol. 2997.

Jones, G., et al., "Context-Aware Retrieval for Ubiquitous Computing Environments," Mobile and Ubiquitous Information Access, Lecture Notes in Computer Science, Jan. 27, 2004, pp. 227-243, vol. 2954.

Shedherd, M., et al., "Browsing and Keyword-Based Profiles: A Cautionary Tale," Proceedings of the 34th Hawaii International Conference on System Sciences, Jan. 3-6, 2001, pp. 1365-1373.

White, R., et al., "The Use of Implicit Evidence for Relevance Feedback in Web Retrieval," Lecture Notes in Computer Science, Jan. 1, 2002, pp. 93-109, vol. 2291.

Berlin, J., et al., "Database Schema Matching Using Machine Learning with Feature Selection," CAISE 2002, LNCS 2348, pp. 452-466, http://www.springerlink.com/contant/73u6cpt0qek8rgh0/.

Brill, E., "A Simple Rule-Based Part of Speech Tagger," Department of Computer Science, University of Pennsylvania, 1992, pp. 1-5.

Claypool, M., et al., "Inferring User Interest," IEEE Internet Computing, 2001, pp. 1-17, vol. 5, No. 6, located at http://web.cs.wpi.edu/~claypool/papers/iui/iui.pdf.

Knezevic, P. et al., "The Architecture Of The Obelix—An Improved Internet Search Engine," Proceedings of the 33rd Annual Hawaii International Conference on System Sciences (HICSS) Jan. 4-7, 2000, Maui, HI, USA, pp. 2145-2155.

Li, W., et al., "Semantic Integration in Heterogeneous Databases Using Neural Networks," Proceedings of the 20th International Conference on Very Large Data Bases, Sep. 12-15, 1994, pp. 1-12, Morgan Kaufmann Publishers, San Francisco, CA.

Li, W., et al., "SEMINT: A Tool for Identifying Attribute Correspondences in Heterogeneous Databases Using Neural Networks," Data Knowl. Eng., Apr. 2000, pp. 484, vol. 33, No. 1, http://dx.doi.org/10.1016/S0169-023X(99)00044-0.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

Phelps, A., "All You Can Seek," Special Services, Jul. 1999, vol. 7, Iss. 7, [online] [Retrieved on Oct. 16, 2006] Retrieved from the Internet: http://www.smartcomputing.com/editorial/article.asp?article=articles/archive/g0707/26g07/26g07.asp.

Scha, R., et al., "An Augmented Context Free Grammar for Discourse," Proceedings of the 12th Conference on Computational Linguistics—vol. 2, Computational Linguistics, Aug. 22-27, 1988, pp. 573-577, Morristown, NJ, http://dx.doi.org/10.3115/991719.991756.

International Search Report and Written Opinion, PCT/US2004/038562, Apr. 6, 2005, 12 pages.

* cited by examiner

SYSTEMS AND METHODS FOR ASSOCIATING A KEYWORD WITH A USER INTERFACE AREA

RELATED APPLICATIONS

This application is a continuation of prior U.S. application Ser. No. 10/814,053, filed on Mar. 31, 2004, which is incorporated by reference herein in its entirety. This application also relates to:

U.S. application Ser. No. 10/814,908, filed on Mar. 31, 2004, entitled "Systems and Methods for Generating Multiple Implicit Search Queries";

U.S. application Ser. No. 10/814,871, filed on Mar. 31, 2004, entitled "Systems and Methods for Extracting a Keyword from an Event";

U.S. application Ser. No. 10/815,074, filed on Mar. 31, 2004, entitled "Systems and Methods for Weighting a Search Query Result";

U.S. application Ser. No. 10/814,056, filed on Mar. 31, 2004, entitled "Systems and Methods for Refreshing a Content Display";

U.S. application Ser. No. 10/814,368, filed on Mar. 31, 2004, entitled "Systems and Methods for Constructing and Using a User Profile";

U.S. application Ser. No. 10/814,365, filed on Mar. 31, 2004, entitled "Systems and Methods for Identifying a Named Entity";

U.S. application Ser. No. 10/815,150, filed on Mar. 31, 2004, entitled "Systems and Methods for Analyzing Boilerplate";

U.S. application Ser. No. 10/813,875, filed on Mar. 31, 2004, entitled "Systems and Methods for Ranking Implicit Search Results";

U.S. application Ser. No. 10/814,052, filed on Mar. 31, 2004, entitled "Systems and Methods for Generating a User Interface"; and U.S. application Ser. No. 10/814,924, filed on Mar. 31, 2004, entitled "Systems and Methods for Providing Search Results," the entirety of all of which are incorporated herein by reference.

FIELD OF THE INVENTION

The present invention relates generally to methods and systems for information retrieval. The present invention relates particularly to systems and methods for associating a keyword with a user interface area.

BACKGROUND

Conventional search engines receive a search query from a user and execute a search against a global index. Such conventional search engines typically use one or more conventional methods for performing a search. For example, one known method, described in an article entitled "The Anatomy of a Large-Scale Hypertextual Search Engine," by Sergey Brin and Lawrence Page, assigns a degree of importance to a document, such as a web page, based on the link structure of the web. The search results are often presented in a list format, including article identifiers and brief snippets about the documents in a web page that can be resized.

A user may also have access to other information stored on the user's local machine or on other storage media accessible via a network that is relevant to a user. Typically, a user enters an explicit search that includes keywords and that is executed against a global or local index (As used herein, a "keyword" or "keywords" is defined broadly to mean words, sequences of words, acronyms or other characters, including spaces, based upon which a search may be performed).

SUMMARY

Embodiments of the present invention provide systems and methods for associating a keyword with a user interface area. In one embodiment of the present invention, a search system, which may be implemented in hardware, software or a combination thereof, associates a keyword with a first user interface area. The system receives a signal that the first user interface area is inactive and that a second user interface area is active. In response, the system generates an implicit search query that includes the keyword. In one embodiment, a computer-readable medium (such as, for example random access memory or a computer disk) comprises code from carrying out such a method.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for associating a keyword with a user interface area. Exemplary embodiments are described below.

System Architecture

Figure 1:
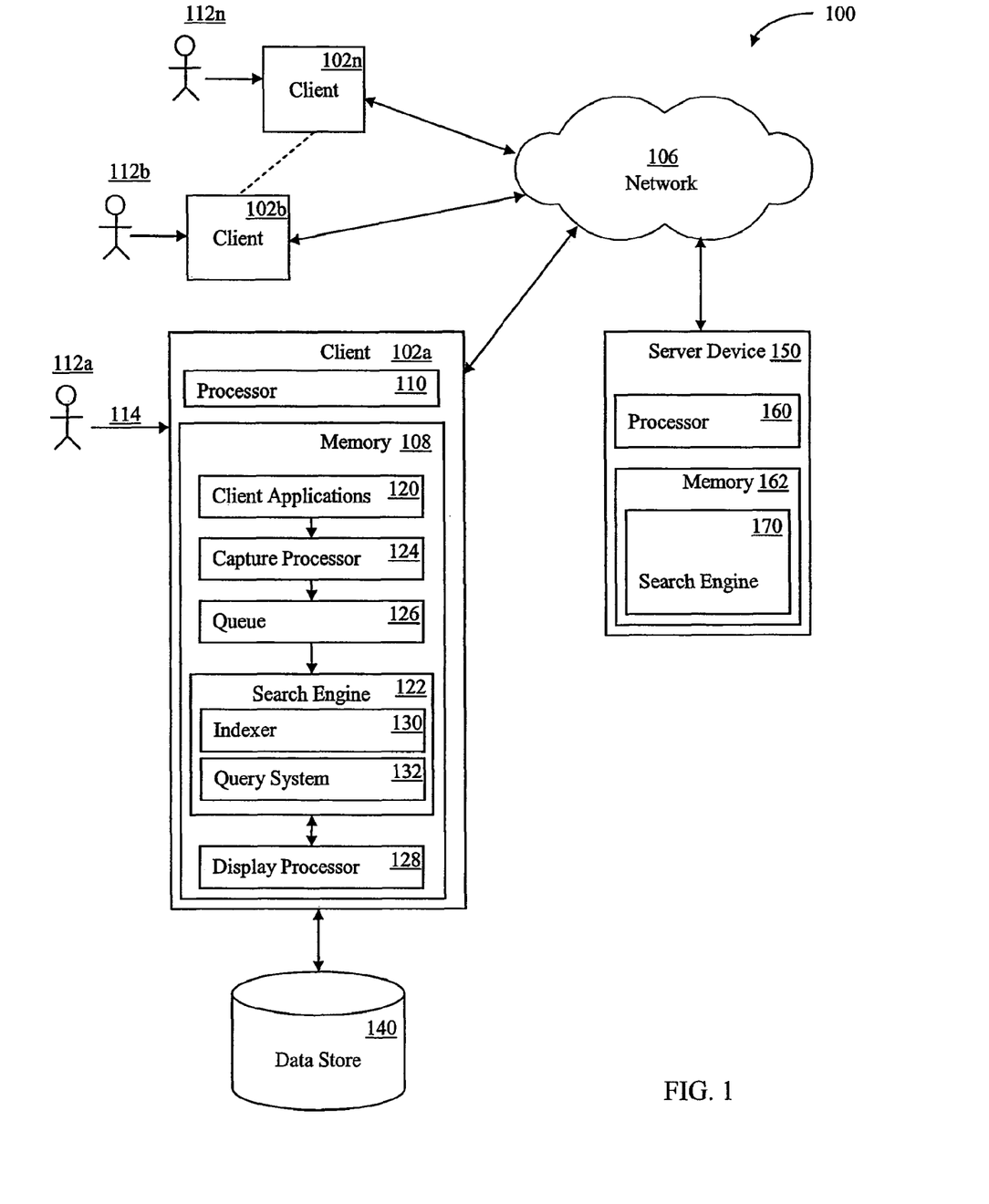
FIG. 1 is a block diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown reflects a client-side search engine architecture embodiment, other embodiments are possible.

The system 100 shown in FIG. 1 includes multiple client devices 102a-n in communication with a server device 150 over a wired or wireless network 106. The network 106 shown comprises the Internet. In other embodiments, other networks, such as an intranet, may be used instead. Moreover, methods according to the present invention may operate within a single client device.

The client devices 102a-n shown each includes a computer-readable medium 108. The embodiment shown includes a random access memory (RAM) 108 coupled to a processor 110. The processor 110 executes computer-executable program instructions stored in memory 108. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any operating system, such as Microsoft® Windows® or Linux, capable of supporting one or more client application programs. For example, the client device 102a shown comprises a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, and any other application or computer program capable of being executed by a client device.

The user 112a can interact with the various client applications 120 and articles associated with the client applications 120 via various input and output devices of the client device 102a. Articles include, for example, word processor, spreadsheet, presentation, email, instant messenger, database, and other client application program content files or groups of files, web pages of various formats, such as HTML, XML, XHTML, Portable Document Format (PDF) files, and audio files, video files, or any other documents or groups of documents or information of any type whatsoever.

The memory 108 of the client device 102a shown also contains a capture processor 124, a queue 126, and a search engine 122. The client device 102a shown also contains or is in communication with a data store 140. The search engine 122 can receive an explicit query from the user 112a or generate an implicit query and retrieve information from the data store 140 in response to the query.

The search engine 122 shown contains an indexer 130, a query system 132, and a formatter 134. Events, real-time and historical, contextual and indexable, and performance data can be sent by the queue 126 to the query system 132 to provide the query system 132 with information concerning current user context. The query system 132 can use this information to generate an implicit query. The query system 132 can also receive and process explicit queries from the user 112a.

The data store 140 can be any type of computer-readable media and can be integrated with the client device 102a, such as a hard drive, or external to the client device 102a, such as an external hard drive or on another data storage device accessed through the network 106. The data store 140 may include any one or combination of methods for storing data, including without limitation, arrays, hash tables, lists, and pairs.

The data store 140 comprises a local index. The local index in the embodiment shown in FIG. 1 may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the client user 1 12a using the client machine 102a, or articles otherwise associated with the client user 102a or the client machine 112a. The local index may be stored in a client machine, such as in data store 140, in a data store on a local network in a manner accessible by the client machine, on a server accessible to the client machine through the Internet, or in another accessible location.

In contrast, a global index may comprise information relevant to many users or many servers, such as, for example, an index of web pages located on multiple servers in communication with the World Wide Web. One example of a global index is an index used by the Google™ search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains. Moreover, an index, local or global, may be present in one or multiple logical or physical locations.

In the embodiment shown in FIG. 1, a user 112a can input an explicit query into a search engine interface displayed on the client device 102a, which is received by the search engine 122. The search engine 122 can also generate an implicit query based on a current user context or state, which can be determined by the query system 132 from contextual real time events or other means. Based on the query, the query system 132 can locate relevant information in the data store 140 or other index and provide a result set. In one embodiment, the result set comprises article identifiers identifying articles associated with the client applications 120 or client articles. Client articles stored in the data store 140 include articles associated with the user 112a or client device 102a, such as the word processing documents, previously viewed web pages and any other article associated with the client device 102a or user 112a. In another embodiment, the result set also comprises identifiers identifying articles located on the network 106 or network articles located by a search engine on a server device. Network articles include articles located on the network 106 not previously viewed or otherwise referenced by the user 112a, such as web pages not previously viewed by the user 112a.

The result sets comprise one or more article identifiers. An article identifier may be, for example, a Uniform Resource Locator (URL), a file name, a link, an icon, a path for a local file, or anything else that identifies an article. In the embodiment shown, an article identifier comprises a URL associated with an article.

Messaging articles stored in the data store 140 include user's emails, chat messages, and instant messaging messages. Each time a message is received, sent, modified, printed, or otherwise accessed, a record is stored in the data store 140. This information can later be searched to identify messages that should be displayed in the user interface.

An embodiment of the present invention may also store message threads in the data store 140. In such an embodiment, messages are related together by various attributes, including, for example, the sender, recipient, date/time sent and received, the subject, the content, or any other attribute of the message. The related messages can then be retrieved as a thread, which may be treated as a document by the display processor 128.

The formatter 134 can receive the search result set from the query system 132 of the search engine 122 and can format the results for output to a display processor 128. In one embodiment, the formatter 134 formats the results in XML or HTML. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. In various embodiments, the functions described herein may be performed by various other components and devices.

Through the client devices 102a-n, users 112a-n can communicate over the network 106, with each other and with other systems and devices coupled to the network 106. As shown in FIG. 1, a server device 150 is also coupled to the network 106. In the embodiment shown, the search engine 122 can transmit a search query comprised of an explicit or implicit query or both to the server device 150. The user 112a can also enter a search query in a search engine interface, which can be transmitted to the server device 150. In another embodiment, the query signal may instead be sent to a proxy server (not shown), which then transmits the query signal to server device 150. Other configurations are also possible.

The server device 150 shown includes a server executing a search engine application program, such as the Google™ search engine. Similar to the client devices 102a-n, the server device 150 shown includes a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of or combination of computer processors, such as processors from Intel Corporation of Santa Clara, Calif. and Motorola Corporation of Schaumburg, Ill.

Memory 162 contains the search engine application program, also known as a search engine 170. The search engine 170 locates relevant information in response to a search query from a client device 102a. The search engine 122 then provides the result set to the client device 102a via the network 106. The result set 134 comprises one or more article identifiers. An article identifier may be, for example, a URL, a file name, a link, an icon, a path for a local file, or anything else that identifies an article. In the embodiment shown, an article identifier comprises a URL associated with an article. The result set may include text, audio, video or any other type of content.

In the embodiment shown, the server device 150, or related device, has previously performed a crawl of the network 106 to locate articles, such as web pages, stored at other devices or systems connected to the network 106, and indexed the articles in memory 162 or on another data storage device. In other embodiments, a crawl is not performed. For example, in one embodiment, an index of articles is created manually.

It should be noted that embodiments of the present invention may comprise systems having different architecture than that which is shown in FIG. 1. For example, in some systems according to the present invention, server device 104 may comprise a single physical or logical server. The system 100 shown in FIG. 1 is merely exemplary, and is used to explain the exemplary methods shown in FIGS. 2 and 3.

Process

Various methods may be implemented in the environment shown in FIG. 1 and other environments, according to the present invention. Methods according to the present invention may be implemented by, for example, a processor-executable program code stored on a computer-readable medium.

In one embodiment of the present invention, a system, such as indexer 130, captures processor 124, or query system 132, associates a keyword with a first user interface area. The query system 132 receives a signal that the first user interface area is inactive and that a second user interface area is active. For example, in a Microsoft® Windows operating environment, the query system 132 may intercept an application programming interface (API) call directed to the operating system that instructs the operating system to maximize a window or other user interface area in which an application is executing. The query system 132 interprets this call as activating the window that is the subject of the call and as inactivating all of the other windows in the user interface. The query system 132 may respond to receiving the call by executing a separate API call to determine all of the windows that are currently executing in the operating system and are inactive (i.e., all of the windows other than the active window).

In response to receiving the signal that the first user interface area is inactive and the second is active, the query system 132 generates an implicit search query that includes the keyword. The keyword may be a single keyword or a plurality of keywords.

In one embodiment, a computer program also identifies the keyword to be associated with the user interface area. For example, the user interface area may include a document, such as a word-processing document. In one embodiment, a computer program is able to retrieve or receive a keyword associated with the document.

The query system 132 receives a second signal indicating that a second user interface area is active and generates an implicit query that includes the keyword from the first user interface area. In such an embodiment, use of the keyword in the implicit query may be discontinued after a period of time has elapsed, e.g., ten seconds in an exemplary embodiment of the present invention. In another such embodiment, the keyword or results associated with the keyword are downweighted after a period of time has elapsed. For example, after ten seconds the results associated with the keyword are downweighted by fifty percent; after 20 seconds, the results are downweighted by seventy-five percent; and after thirty seconds, use of the keyword is discontinued. In another embodiment, the amount of downweighting is a function of the time since the keyword was extracted and/or the corresponding user interface area was active.

The association between the keyword and the user interface area may persist. For example, the keyword and a user interface area identifier may be stored in memory. In one embodiment, the keyword is an attribute of an event as described in relation to FIG. 1. The event may include other attributes, such as an identifier of the user interface area.

In one embodiment of the present invention, the query system 132 submits the search query to a local or global index. In response, the query system 132 receives a result set and causes the result set to be output.

In one embodiment, the query system 132 weights the keywords for the active user interface area (e.g., window) more heavily than keywords for inactive user interface areas. The weight may decrease proportionally to the time since the particular user interface area with which a keyword is associated was last active. If the user switches back to an inactive user interface area, then the keywords for that user interface area become weighted more heavily again. This is facilitated by keeping track of keywords for each active and inactive user interface area. In such an embodiment, sets of one or more keywords (e.g., from events), each of which has a corresponding user interface area identifier and a corresponding time. The weight at which the keywords are used varies depending on the active user interface area, the time since the keywords were created, and the time since the user interface area was last active if it is not currently active. Older keywords have lower weight, and keywords associated with an inactive application have lower weight. If the user interface area becomes active again the weight increases. In another embodiment, the time since an application was last inactive is used in the weighting scheme, with lower weight going to keywords associated with user interface areas that have been inactive for a longer period.

In another embodiment, the system tracks the frequency and total amount of time that a user interface area is active. For example, if a user continually switches back and forth between an IM user interface area and several other applications, the system may recognize the repeated accesses to the IM user interface area and adjust the weight for keywords associated with that user interface area accordingly.

In one embodiment, adjustment of the weighting is performed using a step function that changes at certain predefined thresholds. In another embodiment, the adjustment is performed using a smooth function based on the age of the keyword.

Figure 2:
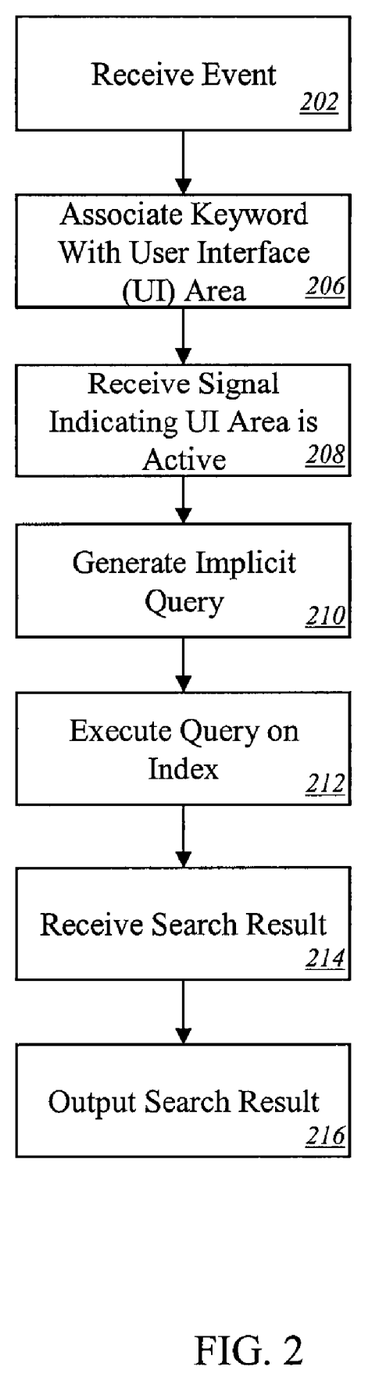
FIG. 2 is a flowchart illustrating a method for associating a keyword with a user interface area in one embodiment of the present invention.

FIG. 2 is a flowchart illustrating a method for associating a keyword with a user interface area in one embodiment of the present invention. In the embodiment shown, a computer program, such as the query system 132, receives an event 202. The event signifies that some activity has occurred. For example, an event may signify that the user has received or sent an email, accessed a document, submitted an explicit query to a search engine, or performed some other activity. The event shown in FIG. 2 signifies that some activity has occurred that is associated with a user interface area. For example, the user may have maximized, minimized, or restored a window, entered text into a document, printed a document, selected text from a web page, or performed some other activity associated with the user interface area.

The event includes attributes. For example, in the embodiment shown, the event includes an identifier of the user interface area containing the application that caused the event to be generated. For example, the user interface area may include a word-processing application. When the user completes a section of text, which is signaled when the user enters a punctuation mark, for example, an event is generated. The event includes an identifier of the word-processing application. The event may also include one or more keywords. The query system 132 associates the keyword(s) with the user interface area 204. The association may be stored in memory or otherwise persist. For instance, in one embodiment, a word processing application executes within a user interface area. When the user completes the typing of a sentence by, for example, entering a period, an event is generated. The event may comprise an identifier of the user interface area as well as a keyword or keywords from the sentence that the user just completed. The query system 132 saves the association between the keyword and the user interface area.

Subsequently, the query system 132 receives a signal indicating that the user interface area with which the keyword or keywords is associated is active 206. For instance, the user may receive an email message and click on the email program to access the message. The query system 132 receives a signal indicating the user interface area associated with the email program is now active. Subsequently, the user clicks on the user interface area in which the word processing application is executing. The query system 132 receives a signal indicating that the user interface area associated with the email program is now inactive, and that the user interface area associated with the word processing program is now active.

After receiving the signal or in response to receiving the signal, the query system 132 generates an implicit query 210. Since the user interface area is active, the embodiment shown in FIG. 2 includes the keywords associated with the user interface area in the implicit query. If the user interface area is not currently active, the keywords may or may not be included within the implicit query. In one embodiment, when keywords associated with non-active user interface areas are used, they are associated with lower weight than keywords corresponding to the active user interface area.

The query system 132 causes the search result to be executed against a global or local index 210. In the embodiment shown, the query system receives the search result or results 212 and causes them to be output to a user 214. For example, the query system 132 may receive or generate an HTML page including the search results and transmit the HTML page to the client 102a.

Figure 3:
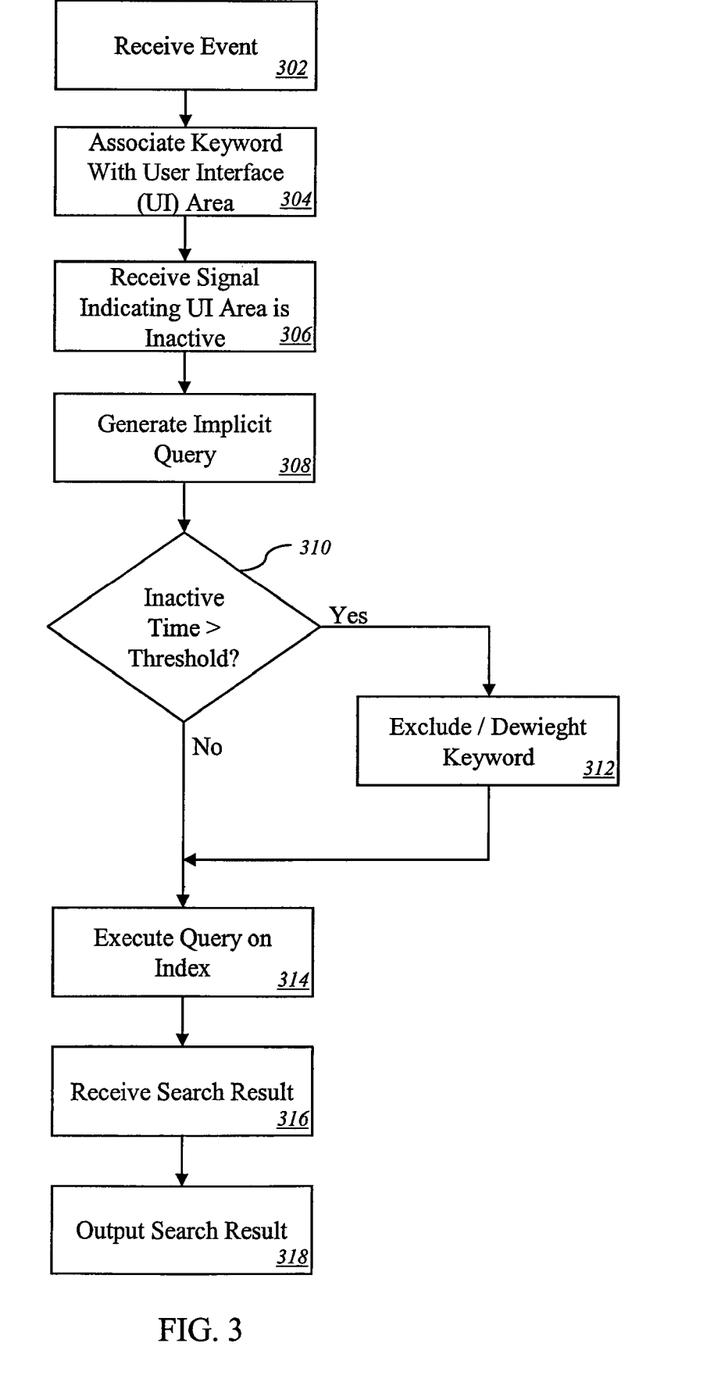
FIG. 3 is a flowchart illustrating a method of reweighting a keyword based on an inactivity period in one embodiment of the present invention.

FIG. 3 is a flowchart illustrating a method of reweighting a keyword based on an inactivity period in one embodiment of the present invention. In the embodiment shown, the query system 132 receives an event 302. The query system 132 associates a keyword of the event with an application user interface area 304.

Subsequently, the query system 132 receives a signal indicating that the application user interface area is inactive 306. For instance, if the user clicks on another application in a different user interface area, the user interface area that is the source of the signal becomes inactive. In the embodiment shown in FIG. 3, once a user interface area is inactive, implicit queries may rely relatively less on keywords associated with the inactive user interface area than they would when the user interface area is active.

The query system 132 next determines whether the amount of time that the user interface area has been inactive exceeds a threshold 310. The threshold may be predetermined or may be based on user or client-specific attributes. For example, the user may explicitly set a limit for the amount of time keywords associated with an inactive user interface area are utilized to perform implicit queries. In an embodiment of the present invention, one or more thresholds may be used. In the embodiment shown, if the inactive time period exceeds the threshold, the keyword is either excluded from implicit queries or the results based on the keywords associated with the inactive user interface area are downweighted in comparison to a keyword associated with an active user interface area 312. In another embodiment, the amount of downweighting is a function of the time since the keyword was extracted and/or the corresponding interface area was active.

The query system 132 executes the implicit query or causes the implicit query to be executed on a global or local index 314. In response, the query system 132 receives search results 316. The query system 132 then causes the query results to be output 318.

Example

Figure 4:
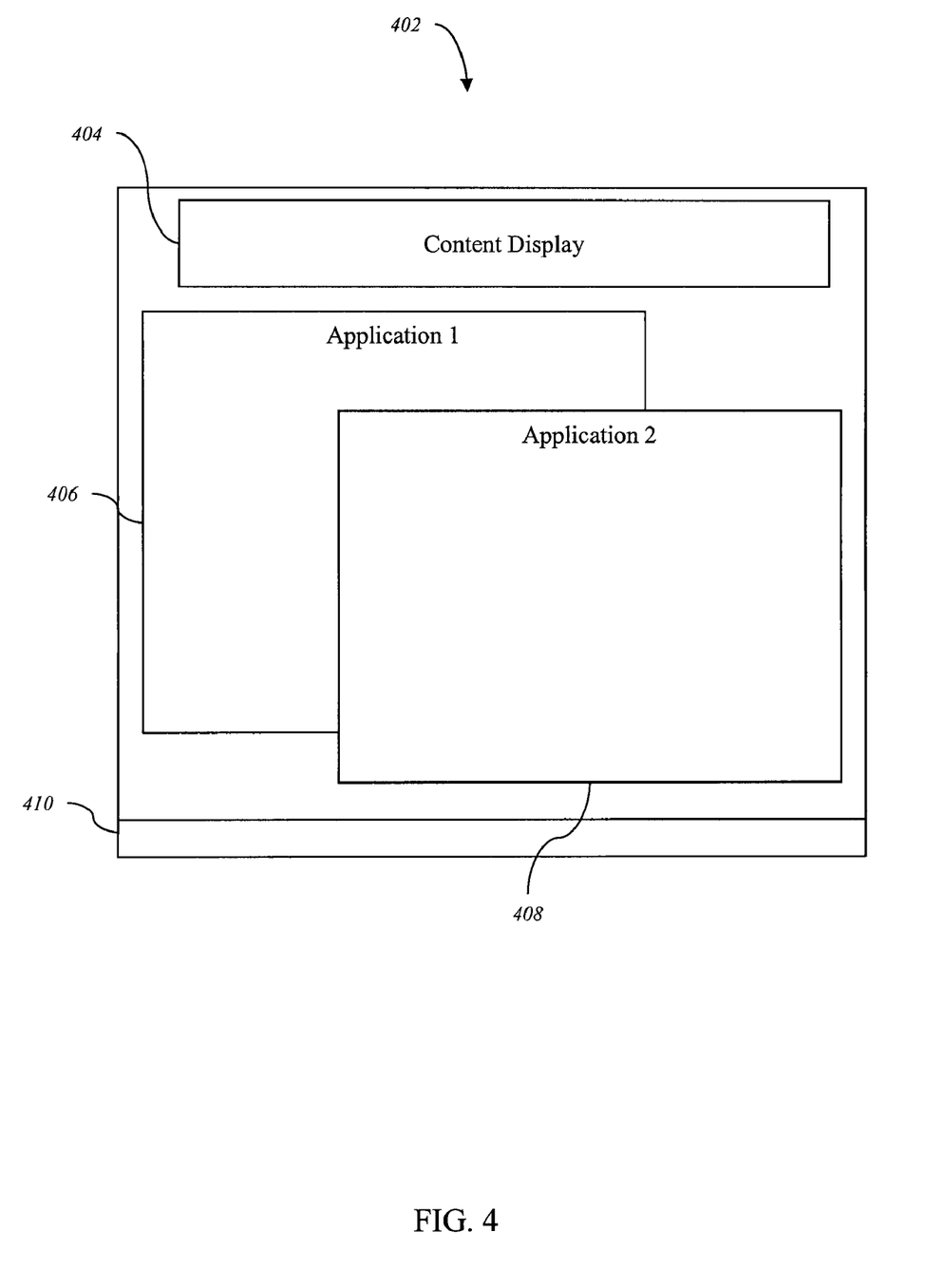
FIG. 4 is a block diagram of a user display in one embodiment of the present invention.

FIG. 4 is a block diagram of a user display in one embodiment of the present invention. The embodiment shown includes a user interface screen 402. The user interface screen 402 includes a content display 404 for displaying the results of search queries. The user interface screen also includes two user interface areas, application windows 406 and 408. The application windows 406, 408 contain two applications, Application 1 and Application 2, respectively, i.e., the two applications execute within the respective windows. The user interface screen 402 also includes a toolbar 410.

In a method according to one embodiment of the present invention, the user enters data into the application executing within the first window 406. As the user enters data, one or more keywords in the data are associated with that window and implicit queries are generated based on the keywords. The results of the implicit queries are displayed in the content display 404.

The user then clicks on the window in which the second application is executing 408. In the embodiment shown, implicit queries continue to be generated periodically (e.g., once per second). Initially, after the first window becomes inactive, the implicit queries include keywords from both the first window 406 and the second window 408. After a specified period of time, the keywords associated with the inactive window 406 are either downweighted in the query or result set, or the keywords are excluded from implicit queries. The time period may be equal to zero, i.e., those keywords are downweighted or excluded immediately when the window becomes inactive. The association of the keyword and the window may persist even though the keyword is not currently used in implicit queries.

In one embodiment, when the user clicks on the window in which Application 1 is executing 406, the keywords that were previously associated with the window are used to form implicit queries. In this way, the content display provides search results to the user that are relevant to the application on which the user is focused or at least are relevant to the currently active application.

General

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method comprising:
associating a keyword with a first user interface area;
receiving an indication that the first user interface area is currently inactive;
generating a search query comprising the keyword associated with the inactive first user interface area, responsive to the first user interface area being inactive for an amount of time not exceeding a threshold period of time;
receiving a result set associated with the search query; and
weighting a result in the result set, responsive to the amount of time that the first user interface area has been inactive.

2. A method comprising:
associating a keyword with a first user interface area;
receiving an indication that the first user interface area is currently inactive;
generating a search query comprising the keyword associated with the inactive first user interface area, responsive to the first user interface area being inactive for an amount of time not exceeding a threshold period of time;
receiving a result set associated with the search query; and
weighting a result in the result set, responsive to a second amount of time that has elapsed since the keyword was associated with the first user interface area.

3. A method comprising:
associating a keyword with a first user interface area;
receiving an indication that the first user interface area is currently inactive;
generating a search query comprising the keyword associated with the inactive first user interface area, responsive to the first user interface area being inactive for an amount of time not exceeding a threshold period of time; and
determining a weight of the keyword associated with the inactive first user interface area, responsive to the amount of time that the first user interface area has been inactive.

4. A method comprising:
associating a keyword with a first user interface area;
receiving an indication that the first user interface area is currently inactive;
generating a search query comprising the keyword associated with the inactive first user interface area, responsive to the first user interface area being inactive for an amount of time not exceeding a threshold period of time; and
determining a weight of the keyword associated with the inactive first user interface area, responsive to a second amount of time that has elapsed since the keyword was associated with the first user interface area.

5. A method comprising:
associating a keyword with a first user interface area;
associating a second keyword with a second user interface area;
receiving an indication that the first user interface area is currently inactive;
receiving an indication that the second user interface area is active since a given time;
generating a search query comprising the keyword associated with the inactive first user interface area, responsive to the first user interface area being inactive for an amount of time not exceeding a threshold period of time, wherein generating the search query comprises generating one or more implicit search queries that collectively include the keyword associated with the inactive first user interface area and the second keyword associated with the active second user interface area;

receiving a result set associated with the one or more implicit search queries;

determining a weight of a first result associated with the keyword associated with the inactive first user interface area in the result set relative to a second result associated with the second keyword associated with the active second user interface area in the result set, responsive to the amount of time that the first user interface area has been inactive and the given time since when the second user interface area has been active; and causing the result set to be output based at least in part on the weight of the first result.

6. The method of claim 5, further comprising:

weighting the second result more than the first result.

7. The method of claim 5, further comprising determining a weight of the keyword associated with the inactive first user interface area, responsive to at least one selected from the group consisting of the given time since when the second user interface area has been active and the amount of time that the first user interface area has been inactive.

8. The method of claim 7, wherein the weight of the first result or the weight of the keyword associated with the inactive first user interface area decreases as the amount of time increases.

9. The method of claim 5, wherein the indication that the second user interface area is active is responsive to a frequency of activity of at least the second user interface.

10. The method of claim 5, wherein the indication that the second user interface area is active is responsive to a total time of activity of at least the second user interface.

11. A computer program product having a non-transitory computer-readable storage medium on which is encoded executable computer program code, the computer program code comprising code for:

associating a keyword with a first user interface area;

receiving an indication that the first user interface area is currently inactive;

generating a search query comprising the keyword associated with the inactive first user interface area, responsive to the first user interface area being inactive for an amount of time not exceeding a threshold period of time;

receiving a result set associated with the search query; and weighting a result in the result set, responsive to the amount of time that the first user interface area has been inactive.

12. A computer program product having a non-transitory computer-readable storage medium on which is encoded executable computer program code, the computer program code comprising code for:

associating a keyword with a first user interface area;

receiving an indication that the first user interface area is currently inactive;

generating a search query comprising the keyword associated with the inactive first user interface area, responsive to the first user interface area being inactive for an amount of time not exceeding a threshold period of time;

receiving a result set associated with the search query; and weighting a result in the result set, responsive to a second amount of time that has elapsed since the keyword was associated with the first user interface area.

13. A computer program product having a non-transitory computer-readable storage medium on which is encoded executable computer program code, the computer program code comprising code for:

associating a keyword with a first user interface area receiving an indication that the first user interface area is currently inactive;

generating a search query comprising the keyword associated with the inactive first user interface area, responsive to the first user interface area being inactive for an amount of time not exceeding a threshold period of time; and determining a weight of the keyword associated with the inactive first user interface area, responsive to the amount of time that the first user interface area has been inactive.

14. A computer program product having a non-transitory computer-readable storage medium on which is encoded executable computer program code, the computer program code comprising code for:

associating a keyword with a first user interface area;

receiving an indication that the first user interface area is currently inactive;

generating a search query comprising the keyword associated with the inactive first user interface area, responsive to the first user interface area being inactive for an amount of time not exceeding a threshold period of time; and determining a weight of the keyword associated with the inactive first user interface area, responsive to a second amount of time that has elapsed since the keyword was associated with the first user interface area.

15. A computer program product having a non-transitory computer-readable storage medium on which is encoded executable computer program code, the computer program code comprising code for:

associating a keyword with a first user interface area;

associating a second keyword with a second user interface area;

receiving an indication that the first user interface area is currently inactive;

receiving an indication that the second user interface area is active since a given time;

generating a search query comprising the keyword associated with the inactive first user interface area, responsive to the first user interface area being inactive for an amount of time not exceeding a threshold period of time, wherein generating the search query comprises generating one or more implicit search queries that collectively include the keyword associated with the inactive first user interface area and the second keyword associated with the active second user interface area;

receiving a result set associated with the one or more implicit search queries;

determining a weight of a first result associated with the keyword associated with the inactive first user interface area in the result set relative to a second result associated with the second keyword associated with the active second user interface area in the result set, responsive to the amount of time that the first user interface area has been inactive and the given time since when the second user interface area has been active; and causing the result set to be output based at least in part on the weight of the first result.

16. The computer program product of claim 15, further comprising:

computer program code for weighting the second result more than the first result.

17. The computer program product of claim 15, further comprising computer program code for determining a weight of the keyword associated with the inactive first user interface area, responsive to at least one selected from the group consisting of the given time since when the second user interface area has been active and the amount of time that the first user interface area has been inactive.

18. The computer program product of claim 17, wherein the weight of the first result or the weight of the keyword associated with the inactive first user interface area decreases as the amount of time increases.

19. The computer program product of claim 15, wherein the indication that the second user interface area is active is responsive to a frequency of activity of at least the second user interface.

* * * * *